United States Patent [19]

Jacobsen et al.

[11] Patent Number: 4,760,699

[45] Date of Patent: Aug. 2, 1988

[54] THERMOSTATIC SERVO-MOTOR, PARTICULARLY FOR VALVES

[75] Inventors: Finn Jacobsen; Jens J. Molbaek; Jan Zangenberg, all of Nordborg; Poul S. Dam, Augustenborg, all of Denmark

[73] Assignee: Danfoss A/S, Nordborg, Denmark

[21] Appl. No.: 594,814

[22] Filed: Mar. 29, 1984

[30] Foreign Application Priority Data

Apr. 18, 1983 [DE] Fed. Rep. of Germany ....... 3314000

[51] Int. Cl.⁴ .............................................. F03G 7/06
[52] U.S. Cl. ......................................... 60/531; 60/530
[58] Field of Search ................. 60/531, 527, 528, 529, 60/530

[56] References Cited

U.S. PATENT DOCUMENTS

| 2,012,674 | 8/1935 | Schultz | 60/531 |
| 2,324,647 | 7/1943 | Ray | 60/531 |
| 2,433,493 | 12/1947 | Turner | 60/531 |
| 2,989,281 | 6/1961 | Fritts | 60/531 X |

FOREIGN PATENT DOCUMENTS 517192 1/1940 United Kingdom ................. 60/531

Primary Examiner—Allen M. Ostrager
Attorney, Agent, or Firm—Wayne B. Easton

[57] ABSTRACT

The invention relates to a thermal servomotor which includes two operating elements which act oppositely on an actuating bridge. The operating elements are thermally insulated from each other and each has a temperature-dependent filling and a separate heating element for differently thermally influencing the two fillings.

7 Claims, 2 Drawing Sheets

THERMOSTATIC SERVO-MOTOR, PARTICULARLY FOR VALVES

The invention relates to a thermal servo-motor comprising two operating elements which act oppositely on an actuating bridge, are thermally insulated from each other and each have a temperature-dependent filling, and a tempering apparatus for differently thermally influencing the two fillings.

In a known thermal servo-motor (U.S. Pat. No. 2,989,281), two bellows boxes provided with a liquid-vapour filling act in opposite senses on a valve servo-element. The bases of the two bellows boxes are fixed with respect to the housing and have a thermo-electric heat pump interposed. The carrier consists of a thermally insulating material. The thermo-electric heat pump can be selectively fed with an adjustable current in the one or other direction with the aid of a change-over switch. One bellows box is therefore always cooled whilst the other is heated. Because of the temperature differences, different vapour pressures are produced through which the valve is either closed or opened.

Such a servo-motor has the advantage that it works substantially independently of the surrounding temperature because the influence of the surrounding temperature is roughly equal and opposite in both bellows boxes. However, a thermo-electric heat pump such as a Peltier element limits the freedom of construction and the possible applications. Thus, the operating elements must have a particular relationship to each other. A.C. operation is not possible. The setting speed is limited because only a limited abutment face is available for the transfer of heat.

The invention is based on the problem of providing a thermal servo-motor of the aforementioned kind of which the construction and use is subjected to fewer restrictions.

This problem is solved according to the invention in that the tempering apparatus comprises two electric heaters which are each associated with one operating element and can be operated at different heating power.

By using the two independent heaters, one has ample constructional freedom regarding the arrangement of the operating elements with respect to each other and in connection with the arrangement of the heater on the operating element. Comparatively large heat transfer faces can be provided. This permits more power to be supplied and thus more rapid movement to be obtained. The heaters may also be energised with alternating current. The heating coils are also considerably cheaper than a heat pump.

It is sufficient if only one of the heaters can be switched on at a time. Alternate heating of the containers gives a comparatively high changing speed in the temperature and thus in adjustment of the motor. In addition, the same speed is obtained in both directions of movement.

Return to the rest position can be particularly rapid if both operating elements are at least partially subjected to the surrounding air. In this way, cooling can be by convection.

In a preferred embodiment, in which the operating elements of the servo-motor are formed by bellows boxes each having a filling of temperature-dependent vapour pressure, the bellows boxes have an outer capsule and the heaters are arranged at the periphery of the outer capsules. The outer capsule offers a comparatively large surface which can be utilised as a thermal transfer surface.

In a preferred embodiment, two outer capsules with confronting bases and interposed thermal insulation are held fixed with respect to the housing and the tappets of both operating elements face away from each other and act on an actuating bridge engaging over the outer capsules. The outer capsules and the thermal insulation may form one structural unit arranged between the parts that are fixed with respect to the housing.

Another advantageous embodiment is where the bases of two outer capsules are held at confronting parts fixed with respect to the housing and the tappets of both operating elements face each other and act on a part of the actuating bridge that projects outwardly between the outer capsules. In this case, the two outer capsules can likewise be easily applied to the rest of the housing.

An alternative solution is where the operating elements are formed by cartridges with a solid filling such as wax and a respective spring element connected in series therewith, the heaters being applied to the periphery of the cartridges. The cartridges with the solid filling result in temperature-dependent volume displacement. However, the interposed spring elements enable the actuating bridge to be set so that both spring elements undergo deformation leading to the same spring force.

In particular, the cartridges may be held fixed with respect to the housing with confronting bases and their tappets may engage the actuating bridge with a respective spring element interposed. In this way, the cartridges can be very simply secured to the housing.

In a particularly simple example, the spring element is an elastic block, for example of a material that is elastic like rubber.

In particular, the heaters may be formed by heating coils. The outer face of the outer capsule or the cartridge is an excellent carrier for such a coil.

Preferred examples of the invention will now be described in more detail with reference to the drawing, wherein.

Figure 1:
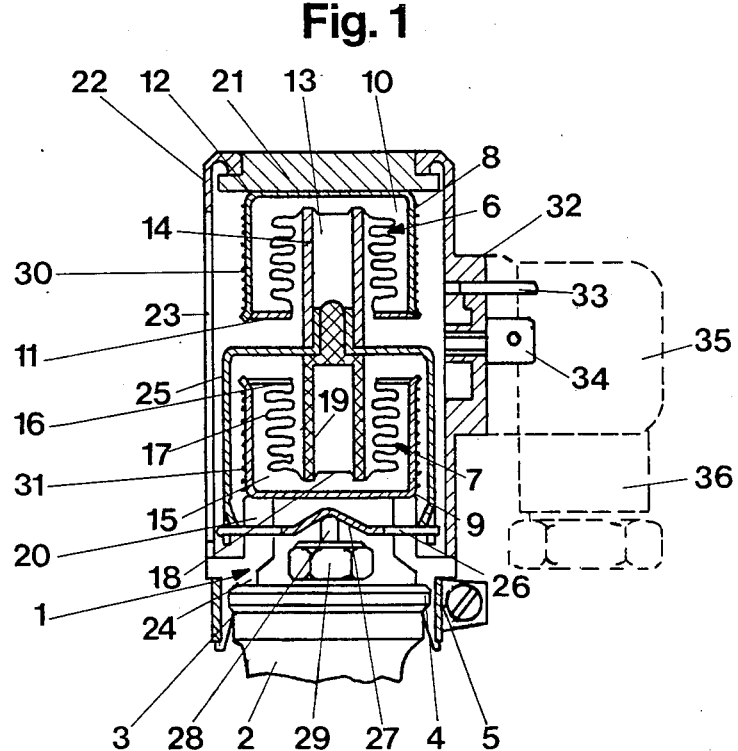
FIG. 1 is a diagrammatic representation of a first embodiment.

The thermal servo-motor of FIG. 1 has a base 1 which, similarly to a thermostat attachment can be placed on a valve housing 2. Spring legs 3 are pushed over a bead 4 of the valve housing and retained by a clamping band 5 inserted in a circumferential groove.

Two operating elements 6 and 7 each comprise an outer capsule 8 or 9, respectively. The interior 10 of the operating element 6 is bounded by the outer capsule 8, an annular flange 11 and resilient bellows 12 of which the end plate acts on a tappet 14 of thermally insulating material. The interior 15 of the operating element 7 is bounded by the outer capsule 9, an annular flange 16 and resilient bellows 17 of which the end wall 18 acts on a tappet 19 of thermally insulating material.

The outer capsule 9 is held on extensions 20 of the base 1. The operating element 6 is supported at a cover 21. The cover is held by a cap 22 which has air slots 23 and is secured to the base 1 by a bead locking connection 24. The two tappets 14 and 19 together act on an actuating bridge 25 which only has longitudinal webs at least at the periphery to permit the passage of air and which is connected to a servo-plate 26. Its central depression 27 can co-operate with a valve actuating pin 28 which is led outwardly through a stuffing box 29 and is loaded within the valve by a spring that presses it outwardly.

The interiors 10 and 15 of the two operating elements 6 and 7 are each provided with a liquid-vapour filling so that the pressure in the respective operating element is a function of the temperature of this operating element. A heating coil 30 is applied to the periphery of the outer capsule 8 and a heating coil 31 to the periphery of the outer capsule 9. At one side, the cap 22 carries a fitting 32 with a plurality of plug pins 33 and 34. On these, one can place a socket 35 having a cable connection 36.

If in an operating situation both operating elements 6 and 7 have the same temperature as, for example, the surrounding temperature, pressure equilibrium is the result. The actuating bridge 25 and the pin 28 then assume a neutral position which is determined solely by the position-dependent force equilibrium of the forces acting in the system, namely on one side the spring action of the bellows 17 and on the other side the spring action of bellows 12 and the valve spring. On the actuating bridge 25 there may also be at least one further preferably adjustable spring for setting the neutral position.

If a temperature difference is produced between the operating elements, e.g. by the heating coil 30 of operating element 6 being heated more than the coil 31 of operating element 7, a pressure difference is set up and hence a difference in the temperature-dependent forces. There is a corresponding change in the position-dependent forces. The spindle therefore moves from the warmer to the cooler operating element.

The high speed of movement is achieved if one operating element is heated whilst the other is cooled by the surrounding air. The position of the pin 28 and the speed of movement can be symmetrically controlled in both directions about the neutral position in that the current in the heating coils and thus the temperature in the operating elements is correspondingly controlled.

Figure 2:
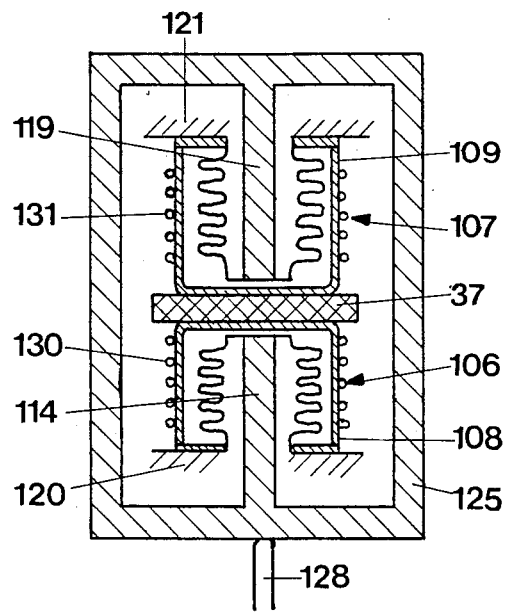
FIG. 2 is a diagrammatic representation of a second embodiment.

In the FIG. 2 embodiment, corresponding parts have reference numerals increased by 100. Here, the two operating elements 106 and 107 are interchanged and disposed between the two fixed parts 120 and 121. The bases of the two outer capsules 108 and 109 confront each other. Thermal insulation 37 is disposed therebetween. The function is the same as in FIG. 1.

Figure 3:
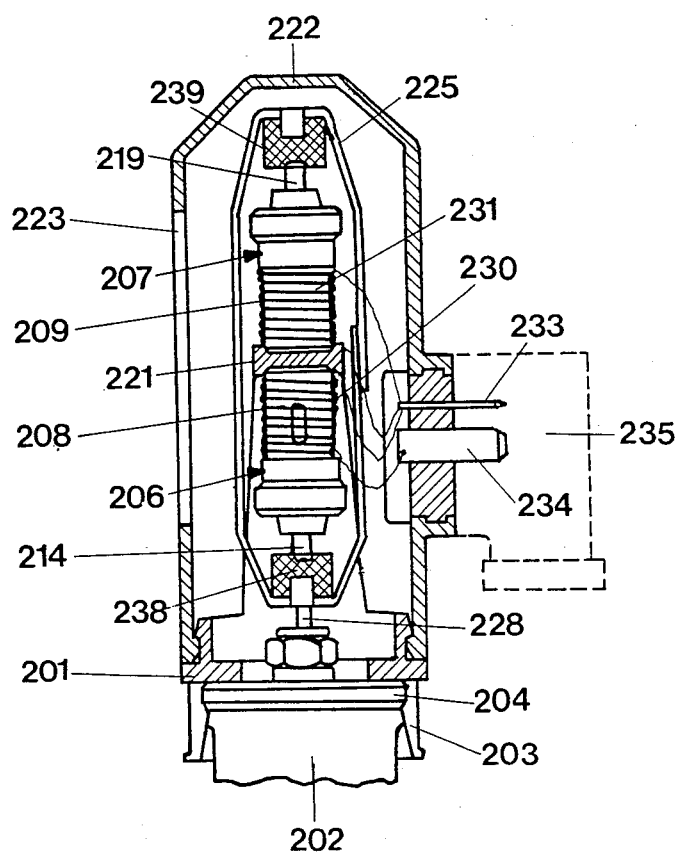
FIG. 3 is a section through a third embodiment.
Figure 4:
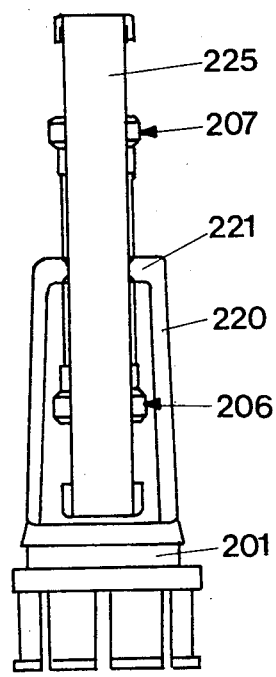
FIG. 4 is a side elevation of the inner parts of the FIG. 3 embodiment.

In the FIGS. 3 and 4 embodiment, corresponding parts have reference numerals increased by 200. In this case, the two operating elements 206 and 207 consist of cartridges 208 or 209 with a solid filling such as wax which pushes the tappets 214 or 219 outwardly as a result of thermal expansion when the temperature increases. The cartridges 208 and 209 lie to each side of a wall 221 carried by extensions 220 of the base 201. The tappet 214 acts on the lower part of the actuating bridge 225 by way of an elastic block 238. The tappet 219 acts on the upper part of the actuating bridge 225 by way of an elastic block 239.

The elastic blocks 238 and 239, which may be of rubber, form spring elements which, upon different thermal expansion of the two operating elements 206 and 207, adjust the actuating bridge 225 in such a way that both spring elements produce the same force as a result of their compression.

In the examples, a liquid-vapour filling or a solid filling is provided in the operating elements in each case. Instead, a different pressure-determining medium may be provided, for example a metal hydride or an adsorption filling.

It is also possible to provide the two operating elements with bellows of different sizes and to arrange the respective corrugated tubes centrally within each other. In this case, two different filling media should be used.

What is claimed:

1. A thermal valve actuating servomotor, comprising, a casing, valve actuating means, first and second operating elements each having fixed and moveable parts forming an expansible chamber with said fixed parts being connected to said casing and said moveable parts being bellows connected to said valve actuating means, each of said fixed parts of each of said operating elements forming a rigid outer shell in surrounding relation to the respective said moveable part, said operating elements being thermally insulated from each other, a temperature dependent filling in each of said elements, first and second electric resistance heating means respectively wound around said shells of said operating elements for respectively thermally influencing said fillings, said first and second heating means being independently operable to selectively heat said fillings to operate said valve actuating means.

2. A servomotor according to claim 1 characterized in that each of said operating elements is at least partially subjected to the surrounding air.

3. A servomotor according to claim 1 with each said fillings generates a temperature-dependent vapour pressure.

4. A servomotor according to claim 2 characterized in that said outer shells have confronting bases fixed relative to said casing and thermal insulation is disposed between said bases, said moveable parts including tappets of both of said operating elements which face away from each other, said valve actuating means being an outer housing actuating bridge which surrounds said operating elements.

5. A servomotor according to claim 4 characterized in that said operating elements are formed by cartridges, said temperature dependent filling each being a solid filling such as wax, spring means disposed between said tappets and said actuating bridges and said heating means being disposed at the periphery of said cartridges.

6. A servomotor according to claim 5 characterized in that said spring means comprise elastic blocks.

7. A servomotor according to claim 1 characterized in that said heating means are formed by heating coils.

* * * * *